(12) United States Patent  
McGettigan et al.

(10) Patent No.: US 7,467,708 B2
(45) Date of Patent: Dec. 23, 2008

(54) BELT CONVEYOR AND METHOD OF CONVERTING A ROLLER CONVEYOR TO A BELT CONVEYOR, AND RETROFIT KIT

(75) Inventors: Michael Thane McGettigan, Muskegon, MI (US); David H. Cotter, Coopersville, MI (US); Kenneth J. Kooistra, Byron Center, MI (US); Curtis E. LeMay, Shelbyville, MI (US)

(73) Assignee: Dematic Corp., Grand Rapids, MI (US)

( * ) Notice: Subject to any disclaimer, the term of this patent is extended or adjusted under 35 U.S.C. 154(b) by 182 days.

(21) Appl. No.: 11/651,810

(22) Filed: Jan. 10, 2007

(65) Prior Publication Data

US 2007/0108026 A1 May 17, 2007

Related U.S. Application Data

(60) Continuation-in-part of application No. 11/504,509, filed on Aug. 15, 2006, which is a continuation of application No. 10/975,199, filed on Oct. 27, 2004, now Pat. No. 7,093,709, which is a division of application No. 10/358,690, filed on Feb. 5, 2003, now Pat. No. 6,811,018.

(60) Provisional application No. 60/424,629, filed on Nov. 7, 2002, provisional application No. 60/356,045, filed on Feb. 11, 2002.

(51) Int. Cl.
  B65G 23/04 (2006.01)
(52) U.S. Cl. .................. 198/835; 198/812; 198/813
(58) Field of Classification Search ............ 198/810.01, 198/835, 834, 812, 813, 817, 460.1, 461.1
  See application file for complete search history.

(56) References Cited

U.S. PATENT DOCUMENTS 3,075,630 A 1/1963 Fisk (Continued)

FOREIGN PATENT DOCUMENTS

| DE | 28 14 436 A1 | 10/1979 |
| DE | 4115327 | 11/1992 |
| EP | 1199262 | 10/2001 |
| FR | 2 425 394 | 12/1979 |
| JP | 2000318825 | 11/2000 |

OTHER PUBLICATIONS

U.S. Appl. No. 11/159,796, filed Jan. 5, 2006, Cotter et al.

(Continued)

*Primary Examiner*—James R Bidwell
(74) *Attorney, Agent, or Firm*—Van Dyke, Gardner, Linn & Burkhart, LLP (57) ABSTRACT

A belt conveyor includes spaced-apart opposite sidewalls and at least two rollers positioned along and between the sidewalls defining a zone in which two of the rollers are end rollers located at opposite ends of the zone. A continuous conveying belt is reeved around the rollers and defines a conveying surface between the sidewalls. At least one of the rollers is a driven roller to drive the conveying belt and move articles along the belt conveyor. The conveying belt is initially stretched lengthwise at least 0.75 percent when it is reeved around the rollers. The conveying belt is tracked around the rollers, without a take up device, by engaging with the rollers. End rollers are mounted to axles, each axle extending through and protruding from both sidewalls. Axle retainers may receive the ends the end roller axles and connect the axle ends to their respective sidewalls. The rollers may be driven in response to an article sensor that senses articles on the conveying belt, in order to convey or accumulate articles on the belt conveyor. The belt may be applied as a retrofit to an existing roller conveyor system, and the belt may be incorporated into a kit which may also include replacement end rollers and/or axle retainers for use at either end of a zone.

21 Claims, 6 Drawing Sheets

U.S. PATENT DOCUMENTS

| | | |
|---|---|---|
| 3,122,935 A | 3/1964 | Morling |
| 3,291,288 A | 12/1966 | Haustovich |
| 3,485,339 A | 12/1969 | Miller et al. |
| 3,608,703 A | 9/1971 | Hitchcock et al. |
| 3,627,108 A | 12/1971 | Hansen |
| 3,722,660 A | 3/1973 | Snead |
| 3,808,658 A | 5/1974 | Looney |
| 3,930,573 A | 1/1976 | Wyman |
| 3,938,313 A | 2/1976 | Marzocchi |
| 3,942,625 A | 3/1976 | Snead |
| 3,995,735 A | 12/1976 | Risley |
| 4,047,444 A | 9/1977 | Jeffrey |
| 4,061,223 A | 12/1977 | McGinnis |
| 4,140,216 A | 2/1979 | Conrad |
| 4,227,607 A | 10/1980 | Malavenda |
| 4,797,602 A | 1/1989 | West |
| 4,832,186 A | 5/1989 | Conrad |
| 4,869,360 A | 9/1989 | Brown et al. |
| 5,022,644 A | 6/1991 | Burge |
| 5,038,917 A | 8/1991 | Kronseder |
| 5,058,727 A | 10/1991 | Jahns et al. |
| 5,070,995 A | 12/1991 | Schaffer et al. |
| 5,083,655 A | 1/1992 | Becker |
| 5,137,139 A | 8/1992 | Ruscello |
| 5,213,202 A | 5/1993 | Brink |
| 5,285,887 A | 2/1994 | Hall |
| 5,341,915 A | 8/1994 | Cordia et al. |
| 5,442,248 A | 8/1995 | Agnoff |
| 5,582,286 A | 12/1996 | Kalm et al. |
| 5,620,084 A | 4/1997 | Mensch |
| 5,957,263 A | 9/1999 | Espenschied |
| 6,029,800 A | 2/2000 | Kratz et al. |
| 6,065,588 A | 5/2000 | Cotter et al. |
| 6,244,421 B1 | 6/2001 | Hall |
| 6,244,427 B1 | 6/2001 | Syverson |
| 6,253,906 B1 | 7/2001 | Hall |
| 6,253,909 B1 | 7/2001 | Kalm et al. |
| 6,269,939 B1 | 8/2001 | Lapeyre et al. |
| 6,378,694 B1 | 4/2002 | Onoyama et al. |
| 6,478,142 B2 | 11/2002 | Cotter et al. |
| 6,811,018 B2 * | 11/2004 | Cotter et al. ............. 198/460.1 |
| 6,814,222 B2 | 11/2004 | Henson et al. |
| 7,063,206 B2 | 6/2006 | Haan et al. |
| 7,093,709 B2 * | 8/2006 | Cotter et al. ................ 198/835 |
| 7,128,201 B2 | 10/2006 | Jones |

OTHER PUBLICATIONS

U.S. Appl. No. 11/504,509, Cotter et al.

Belted MDR—Motor Driven Roller Belted Conveyor System Brochure. Intelligrated Material Handling Solutions & Services, Cincinnati, Ohio, Feb. 2002.

Supplementary European Search Report dated Mar. 15, 2005 for European Application No. EP 03 73 9711 (1 page).

\* cited by examiner

BELT CONVEYOR AND METHOD OF CONVERTING A ROLLER CONVEYOR TO A BELT CONVEYOR, AND RETROFIT KIT

CROSS-REFERENCE TO RELATED APPLICATIONS

The present application is a continuation in part of U.S. patent application, Ser. No. 11/504,509 filed Aug. 15, 2006 by Cotter et al., which is a continuation of U.S. patent application, Ser. No. 10/975,199, filed Oct. 27, 2004, now U.S. Pat. No. 7,093,709, which is a division of U.S. patent application, Ser. No. 10/358,690, filed Feb. 5, 2003, now U.S. Pat. No. 6,811,018, which claims priority of U.S. provisional applications, Ser. No. 60/356,045, filed Feb. 11, 2002, and Ser. No. 60/424,629, filed Nov. 7, 2002, which are all hereby incorporated herein by reference.

FIELD OF THE INVENTION

The present invention relates generally to conveyors and, more particularly, to belt conveyors.

BACKGROUND OF THE INVENTION

It is known to provide zones of rollers along a roller conveyor, where each zone includes a driven roller and/or a plurality of idler or freely rotating rollers. The driven roller is typically operable to drive the idler rollers via a plurality of O-rings connecting each roller to an adjacent roller in the zone. Each zone may be independently operable to accumulate articles on a particular zone or zones, or to generally continuously convey articles along the zones of the roller conveyor. However, such roller conveyors are not suitable for certain applications where belt conveyors are desired, such as for conveying small articles which may fall between the rollers, for conveying damaged articles or articles with loose parts that may tend to become entangled with individual rollers, or for applications where a belt conveyor may be required or desired for other reasons. Also, due to relatively low friction between typical rollers and the articles being conveyed thereon, such roller conveyors are not suitable for providing accumulation of articles along an inclined or declined section of the roller conveyor.

SUMMARY OF THE INVENTION

The present invention provides a belt conveyor that is suitable for continuously conveying articles along the conveyor or along segments or zones of the conveyor, and for accumulating articles on the individual segments or zones. The invention may provide for accumulation of articles on an incline or a decline if desired. The invention also provides a kit, and a method for installing the kit, to convert an existing roller conveyor to a belt conveyor.

According to an aspect of the present invention, a belt conveyor includes spaced-apart opposite sidewalls and at least two rollers positioned along and between the sidewalls defining a zone in which two of the rollers are end rollers located at opposite ends of the zone. A continuous conveying belt is reeved around the rollers, the conveying belt defining a conveying surface between the sidewalls. At least one of the rollers is a driven roller to drive the conveying belt and move articles along the belt conveyor. The conveying belt is initially stretched lengthwise at least 0.75 percent when it is reeved around the rollers. The conveying belt is tracked around the rollers, without a take up device, by engaging with the rollers.

According to another aspect, a belt conveyor's end rollers are mounted to axles, each axle extending through and protruding from both sidewalls. According to another aspect, a belt conveyor includes at least two axle retainers, each having at least one hole that receives an end of an axle, the axle retainer connecting the axle end to a respective sidewall.

According to yet another aspect, a belt conveyor includes a contact assembly, a drive member, and a lifting device. The lifting device reciprocates to move the contact assembly and cause the drive member to engage at least one of the rollers and drive the conveying belt.

According to still another aspect, a belt conveyor includes a motor-driven roller, such as a motorized roller, that drives the conveying belt.

According to another aspect, a belt conveyor has two or more tandem zones, each including at least two rollers and a conveying belt. According to another aspect, each zone of the belt conveyor has at least one article sensor to detect articles in a zone, and a control to selectively drive at least one driven roller to drive the conveying belt. Each control may be operable to selectively accumulate articles in a zone.

According to another aspect, a retrofit kit may be applied to a roller conveyor having at least two conveying rollers positioned between opposite sidewalls and forming at least one zone, in which the retrofit kit includes one or more conveying belts that are stretched at least 0.75 percent when installed over the rollers, the kit further including at least one replacement end roller having an axle longer than the spacing of the sidewalls between which the replacement end roller is to be installed, and at least two axle retainers to receive the ends of the axle at the sidewalls.

According to another aspect, a method of converting a roller conveyor to a belt conveyor includes providing a roller conveyor with one or more zones, each zone including two or more conveying rollers positioned between opposite sidewalls, where two of the conveying rollers are end rollers located at opposite ends of each zone. The method further includes providing at least one continuous conveying belt, at least one replacement end roller, and at least two axle retainers. The rollers of a given zone are removed from the roller conveyor, after which one or both end rollers may be replaced by the replacement end rollers. The conveying belt may then be routed or reeved around the rollers, and stretched at least 0.75 percent as the rollers are positioned between the opposite sidewalls. The axle retainers are connected to the sidewalls at an end, or at both ends, of each zone. Once the rollers are in position with the conveying belt reeved around them, the axle retainers may be connected to the ends of the end roller axles.

According to another aspect, a belt conveyor includes two or more zones that may be independently operable to allow for accumulation of articles at one or more zones along the belt conveyor. Each zone may include an article sensor that is operable to detect articles on the belt of the respective zone, whereby the conveying belt of each zone is operable in response to the sensor and the particular application of the zoned belt conveyor.

Therefore, the present invention provides a belt conveyor which may have a plurality of independently operable zones or segments, each of which includes a continuous conveying belt, at least two rollers, and axle retainers. The zones may operate together as a generally continuously running belt conveyor or may operate individually as an accumulating conveyor with zone control and photo eyes or sensors. The invention may be practiced by applying a retrofit kit to an existing roller conveyor. The present invention thus provides a zone controlled belt conveyor which may operate in a similar manner as a zone controlled roller conveyor, but with a conveying belt reeved around the rollers.

These and other objects, advantages, purposes, and features of the present invention will become apparent upon review of the following specification in conjunction with the drawings.

DESCRIPTION OF THE PREFERRED EMBODIMENTS

Figure 1:
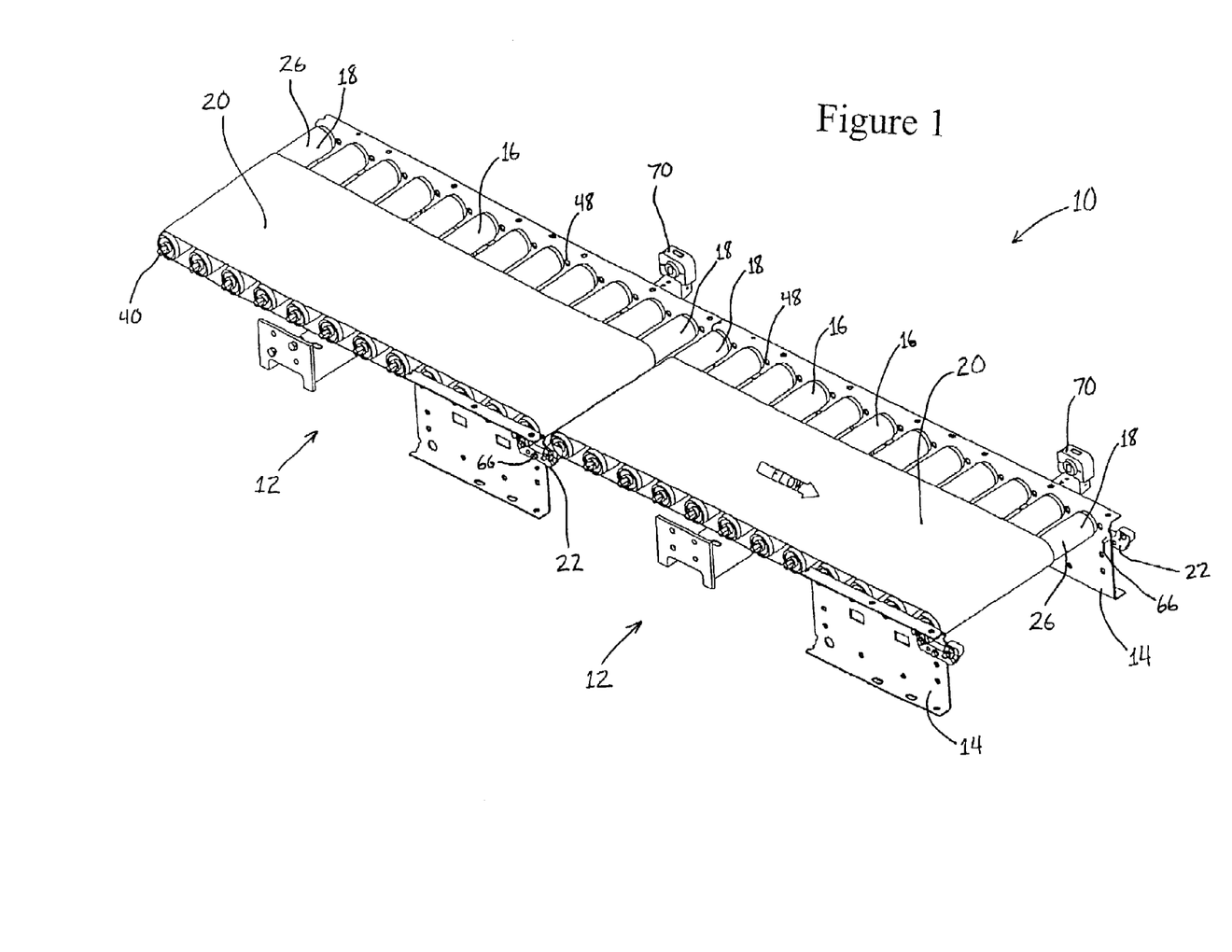
FIG. 1 is a perspective view of a portion of a segmented or zoned belt conveyor in accordance with the present invention.
Figure 3:
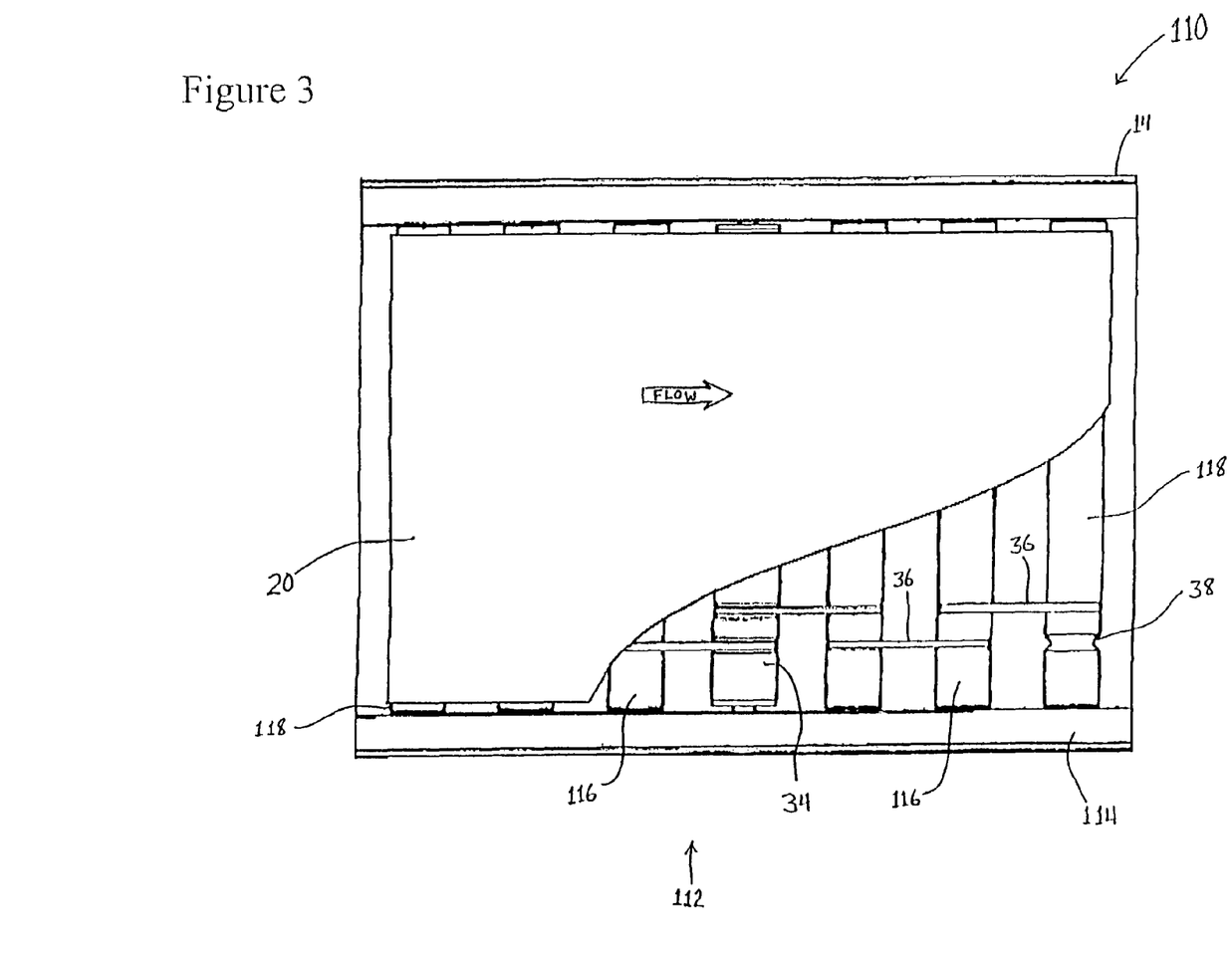
FIG. 3 is a top plan view of a belt conveyor zone in accordance with another embodiment, with a portion of the conveying belt cut away.

Referring now specifically to the drawings and the illustrative embodiments depicted therein, a belt conveyor or belt accumulator 10, 110 includes one or more zones or segments 12, 112 positioned along and between opposite sidewalls or side frames 14, 114, and is operable to convey articles in a direction of conveyance indicated by the arrow marked "flow" (FIGS. 1 and 3). Each segment or zone 12, 112 includes a plurality of rollers 16, 116 including two end rollers 18, 118 one at each opposite end of each zone 12, 112, and a continuous conveying belt 20 routed or reeved around rollers (16 and 18, or 116 and 118) to convey articles on its top portion. Each end roller 18, 118 may be connected to an axle retainer 22 at each sidewall 14, 114 of belt conveyor 10, 110. In the illustrated embodiments, conveying belt 20 is a low modulus belt of the type disclosed in commonly assigned U.S. Pat. No. 6,811,018.

Each belted zone 12, 112 may be independently operable to accumulate articles on the zone 12, 112 or to move articles in the flow direction onto a next, adjacent segment or zone or onto another conveyor, such as another belt conveyor, a roller conveyor, a slider bed, or the like, or any other means for receiving articles from a discharge end of the last zone or segment of the zoned belt conveyor 10, 110. Thus, belt conveyor 10, 110 may be used to convey small articles which might otherwise fall between the rollers, to convey damaged articles or articles with loose parts that may tend to become entangled with individual rollers, or for applications where a belt conveyor may be required or desired for other reasons such as transporting articles along inclines or declines.

Belt conveyor 10, 110 may be manufactured from new components, or alternatively, belt conveyor 10, 110 may be constructed by modifying an existing roller conveyor such as that which is disclosed in U.S. Pat. No. 6,478,142, the disclosure of which is hereby incorporated herein by reference. Where it is desirable to modify a roller conveyor to be a belt conveyor, a retrofit kit 24 (FIG. 8) may be provided to supply the components useful in performing a retrofit, such as the low modulus continuous conveying belt 20, replacement end rollers 26, and axle retainers 22. Whether belt conveyor 10, 110 is newly manufactured or is constructed by modifying an existing roller conveyor, the various features and components of belt conveyor 10, 110 may be substantially the same.

Figure 8:
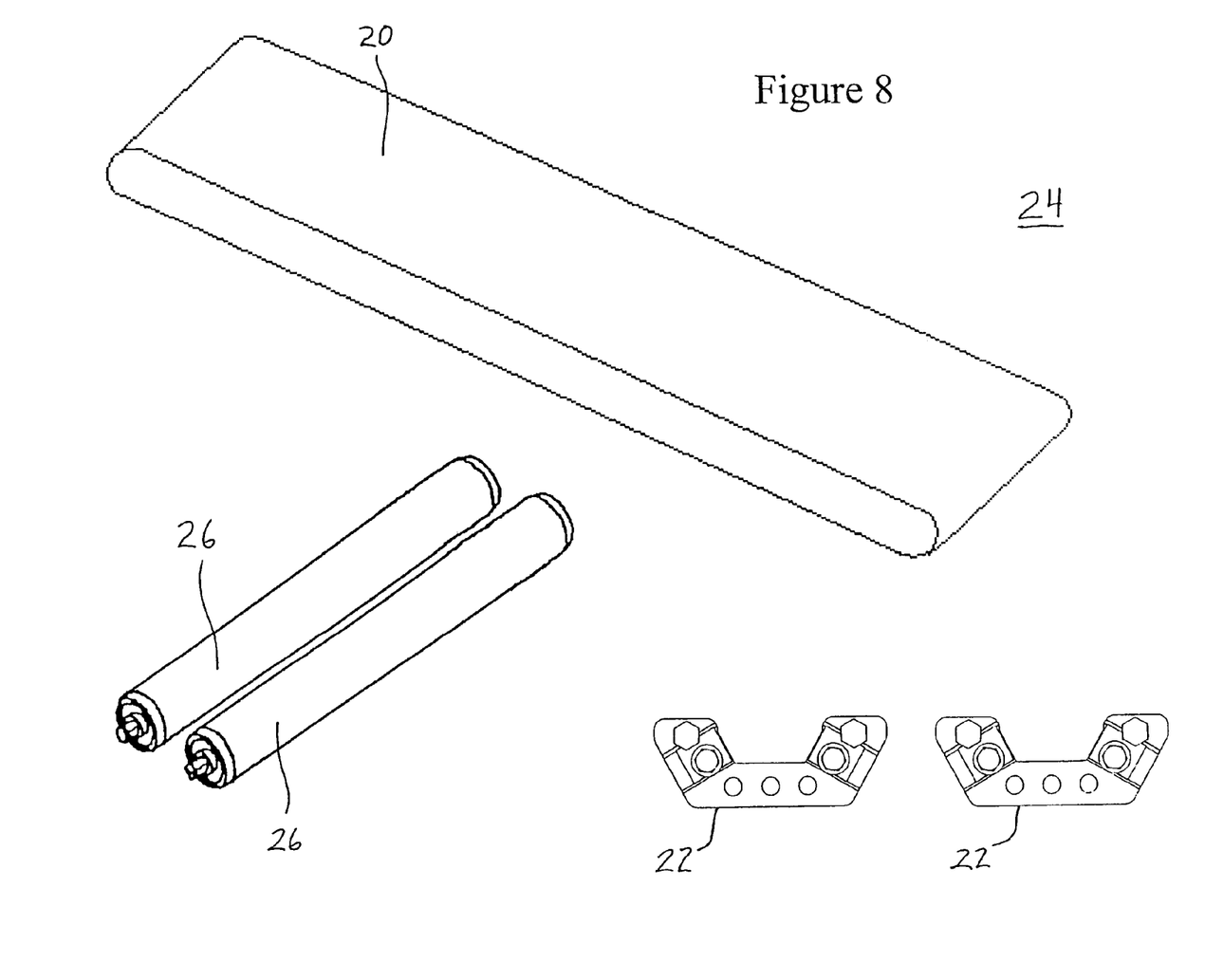
FIG. 8 is an exploded view of a retrofit kit in accordance with the present invention.

As noted above, retrofit kit 24 may include a conveying belt 20, replacement end rollers 26, and axle retainers 22. Replacement end rollers 26 and axle retainers 22 may improve the durability of the resulting belt conveyor when additional stresses are applied to any roller located at an end of a zone by the addition of the low modulus conveying belt 20, as will be discussed below.

Figure 2:
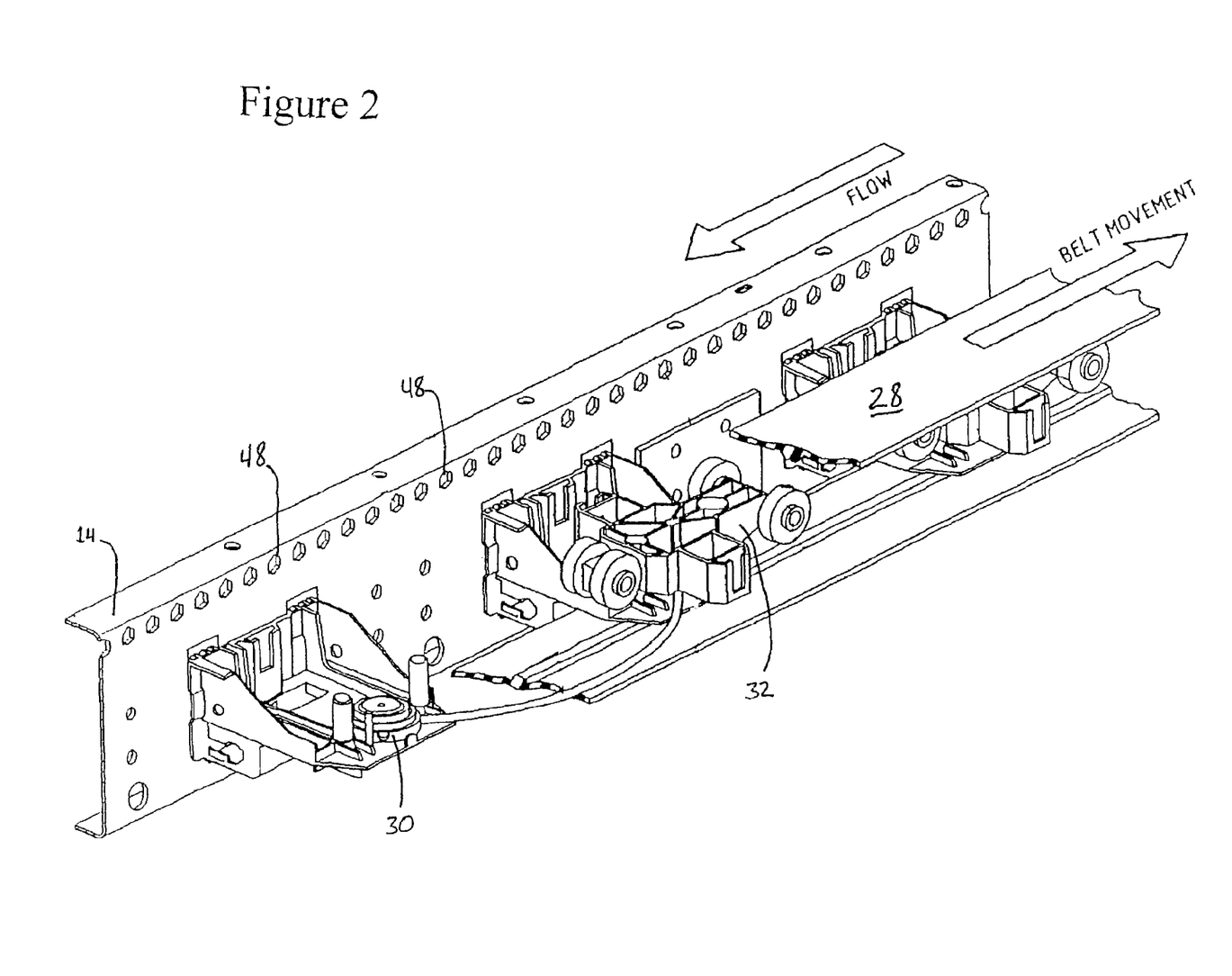
FIG. 2 is a perspective view of a drive mechanism for an accumulation conveyor according to a preferred embodiment of the invention, with a portion of the drive member cut away.

In the embodiment of FIG. 2, a power source (not shown) drives an endless drive member, such as a belt 28, which is urged into frictional contact with rollers 16, 18, 26 by a lift device 30 acting upon a contact assembly 32, the contact assembly 32 acting upon drive member 28. Drive member 28 has an upper portion traveling in a plane at or below rollers 16, 18, 26, and drive member 28 has an inner portion engaged by contact assembly 32 when lift device 30 is actuated to bring drive member's 28 upper portion into contact with rollers 16, 18, 26. Drive member's power source may be electric, such as an AC or DC motor driving a V-belt, a cog belt, a chain, or a gear train, or the power source may be a motorized roller, for example. Drive member's power source may also be non-electric, such as a pneumatic motor. Lift device 30 may typically be electrically, mechanically, or pneumatically driven to vertically reciprocate. The reciprocating motion of lift device 30 may be generated, for example, by a pneumatic actuator such as "force producing device" disclosed in U.S. Pat. No. 6,065,588 issued to Cotter et al., or by a non-pneumatic actuator such as the "electric actuator" disclosed in U.S. Pat. No. 6,814,222 issued to Henson et al., which are both hereby incorporated herein by reference.

In the embodiment of FIG. 3, a power source such as a motor-driven roller or a motorized roller 34, drives a plurality of rollers 116 and preferably also drives end rollers 118 via a series of connecting members 36 such as O-rings, cog belts, V-belts, chains, or the like (O-rings shown), the rollers 116, 118 being mounted at and between sidewalls 114. Rollers 116, end rollers 118, and motorized roller 34 may have one or more circumferential grooves 38 to receive connecting members 36. When electrical energy is applied to motorized roller 34, motorized roller 34 begins to turn, thus transferring torque from motorized roller 34 to rollers 116 and preferably to end rollers 118 via connecting members 36 at grooves 38 so that the rollers 34, 116, 118 turn at substantially the same rate. Conveying belt 20 is reeved around rollers 34, 116, 118 and conveying belt 20 is therefore driven by and around rollers 34, 116, 118.

Optionally, other means for driving the conveying belt 20 may be implemented while remaining within the spirit and scope of the present invention. For example, motorized roller 34 (FIG. 3) may be located at an end of the zone 112 to frictionally engage conveying belt 20. Alternatively, one or more rollers 116, or especially one or both end rollers 118 of a particular zone 112, may include a pulley or gear and a connecting member (not shown), at an end of that roller 118, the connecting member drivably connected to a remote power source.

In the embodiment of FIG. 1, conveying belt 20 may be wide enough to cover a portion of the rollers to provide a wide conveying surface for conveying articles along the conveyor while leaving a portion of the rollers exposed. Optionally, and as shown, conveying belt 20 and drive member 28 may be aligned at opposite ends of the rollers 16, 18, 26, conveying belt 20 having a width greater than half of the length of rollers, and drive member 28 having a width less than half the length of the rollers. This configuration, among others, allows direct contact between the rollers 16, 18, 26 and drive member 28, unimpeded by conveying belt 20 (FIGS. 1 and 2). Alternatively, conveying belt 20 may cover substantially the entirety of the generally cylindrical portions of the rollers 116, 118, such as where at least one of the rollers is a motorized roller 34 (FIG. 3).

Conveying belt 20 may be a low modulus belt. In the illustrated embodiments, conveying belt 20 has a stretch capability or characteristic of at least approximately 1.5% stretch or more and may have a stretch capability or characteristic of approximately 3% to 5% stretch or more in its lengthwise direction. Conveying belt 20 may be initially stretched as it is reeved around rollers 16, 18, such that the belt has an initial stretch of approximately 0.75% or more in its lengthwise direction when positioned around rollers 16, 18, and may be initially stretched to have an initial stretch of approximately 1% or 1.5%. Conveying belt 20 provides a substantially greater amount of stretch over conventional conveyor belts, which typically may only provide approximately a 1% stretch characteristic or less, and typically may have an initial stretch of approximately 0.25% to 0.5% when reeved or positioned around the pulleys of a conventional belt conveyor.

The low modulus characteristic of conveying belt 20 and the approximately 0.75% or more initial stretch of conveying belt 20 allows each zone 12, 112 of the belt conveyor 10, 110 to be operated with little or no take-up or adjustment being necessary to maintain the appropriate tension in conveying belt 20. However, such adjustment may be provided on belt conveyor 10, 110, without affecting the scope of the present invention. Conveying belt 20 is described in more detail in U.S. Pat. No. 6,811,018.

Rollers 16, 116 may be any type of rollers, such as conventional, freely rotating rollers, such as the types commercially available from various sources, such as Dematic Corp. of Grand Rapids, Mich. End rollers 18, 118 and replacement end rollers 26 are preferably of a more robust construction to resist high belt tension loads, as will be described in more detail below. Although shown in the illustrations as having multiple rollers along each of zones 12, 112 one or more zones 12, 112 of the zoned belt conveyor 10, 110 of the present invention may include a support plate or slider bed (not shown) between the end rollers 18, 118, 26 to support conveying belt 20 without affecting the scope of the present invention.

Figure 4:
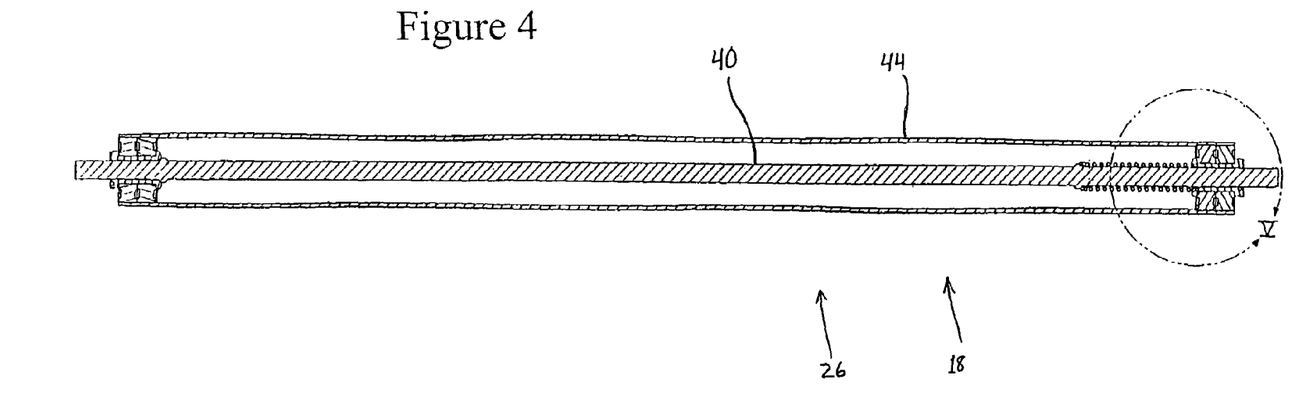
FIG. 4 is a sectional view of a full-axle end roller.

End rollers 18, 118 and replacement end rollers 26 (FIGS. 4 and 5) are preferably able to withstand high transverse loads imparted by the stretched low modulus conveying belt 20 to end rollers 18, 118, 26 located at each end of each zone 12, 112. End rollers 18, 118, 26 thus may include features such as full-length axles 40, heavy-duty bearings 42, or other strengthening features (FIGS. 3 and 4). Replacement end rollers 26 may replace one or both end rollers 18, 118 in each zone on which a conveying belt 20 is to be installed when converting a portion of the roller conveyor to a belt conveyor zone 12, 112. End rollers 18, 118, 26 may include a roller shell 44 (FIG. 4) that is in constant frictional contact with conveying belt 20. In the embodiment of FIGS. 1 and 2, roller shell 44 is also in intermittent or constant frictional contact with drive member 28.

Roller shell 44 may have one or more crowns or bumps 46 along roller shell 44 to assist in tracking belt 20 during operation of belt conveyor 10, 110. The use of crowns 46 to track belt 20 is disclosed in commonly assigned U.S. Pat. No. 6,811,018, the disclosure of which is hereby incorporated herein by reference. Crowns 46 may comprise one or more slightly larger diameter regions of the roller shell 44, such as two or three regions (or more or less depending on the length of the roller and the particular application) having, for example, approximately a 1-4 mm larger diameter than the diameter of the generally cylindrical roller shell 44, which may typically have a diameter of approximately 50 mm. Crowns 46 may be formed as part of the roller shell 44 or may comprise molded portions, such as molded polyurethane portions or the like, positioned along the roller shell 44, without affecting the scope of the present invention. Roller shell 44 may further incorporate circumferential grooves 38, as in FIG. 3, engaged by connecting members 36 (not shown in FIG. 4 or 5).

Axles 40 preferably have a non-circular cross section, for example, a six-sided hex cross section, so that axles 40 may be gripped and held substantially stationary during operation of the belt conveyor 10, 110. Sidewalls 14, 114 have a plurality of sidewall apertures or holes 48 (FIGS. 1 and 2) to receive the ends of axles 40, and sidewall apertures 48 may be shaped to fit closely around axles 40, such as with a hex shape. Axles 40 are preferably longer than the distance between sidewalls 14, 114 such that each end of each axle 40 extends through and protrudes from sidewall apertures 48. To aid installation of end rollers 18, 118, 26, a compression spring 50 may be installed on axle 40 (FIGS. 3 and 4) to allow an operator to insert one end of axle 40 through sidewall aperture 48 (FIG. 2) while compressing spring 50, and then allowing spring 50 to push the other end of axle 40 through a corresponding aperture 48 in the opposite sidewall 14, 114.

Additional support may be provided to end rollers 18, 118 or replacement end rollers 26 by connecting the rollers' axles 40 to axle retainers 22, which may themselves be connected to sidewalls 14, 114 (FIGS. 1, 5, and 6) at sidewall apertures 48. One embodiment of such an axle retainer 22, illustrated in FIGS. 5 and 6, consists of a base plate 52 having at least one clamping aperture or hole 54. Axle retainer 22 preferably includes a means for reducing or maintaining the size of clamping aperture 54, such as a movable adjustment block 56 and a bolt 58, to avoid axle movement that could cause wear over time. In the embodiment shown in FIGS. 5 and 6, axle retainer 22 has two hex-shaped clamping apertures 54, one to receive the axle of the lead end roller of one zone, and another to receive the axle of the trailing end roller of the adjacent zone.

Figure 5:
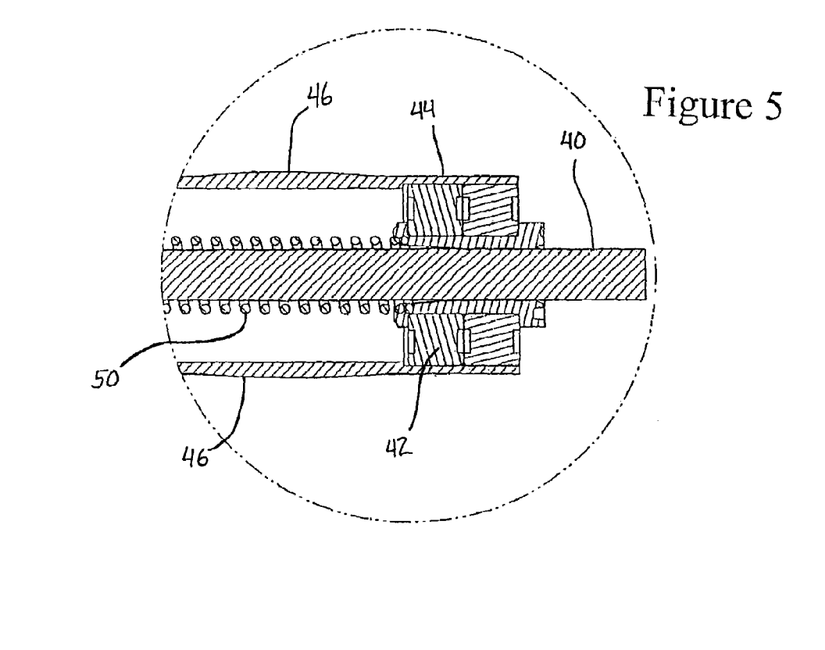
FIG. 5 is an enlarged view of the area designated section V in FIG. 4.
Figure 6:
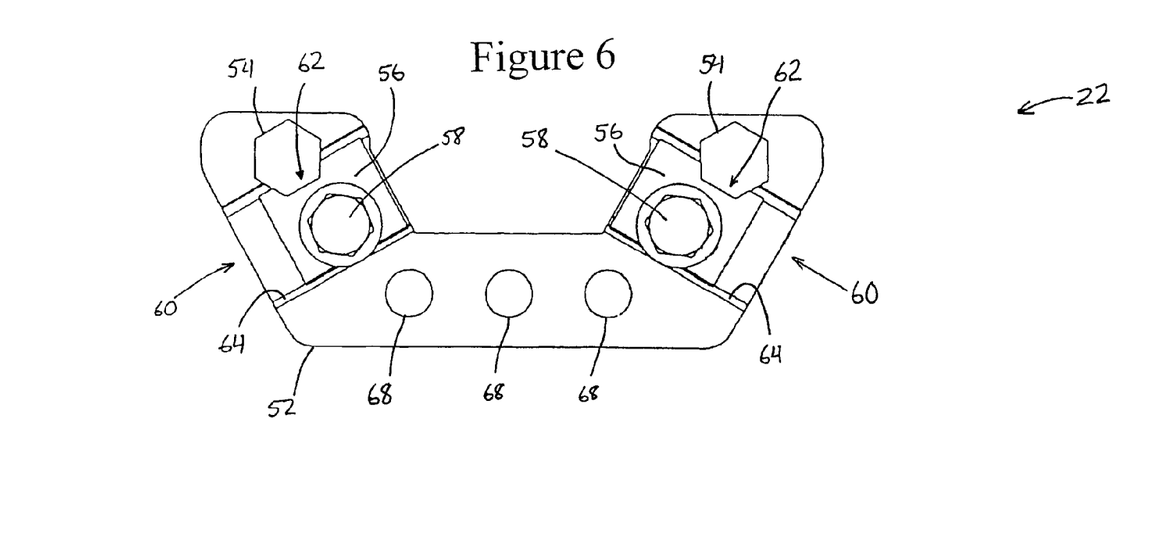
FIG. 6 is a top plan view of an axle retainer in accordance with the present invention.
Figure 7:
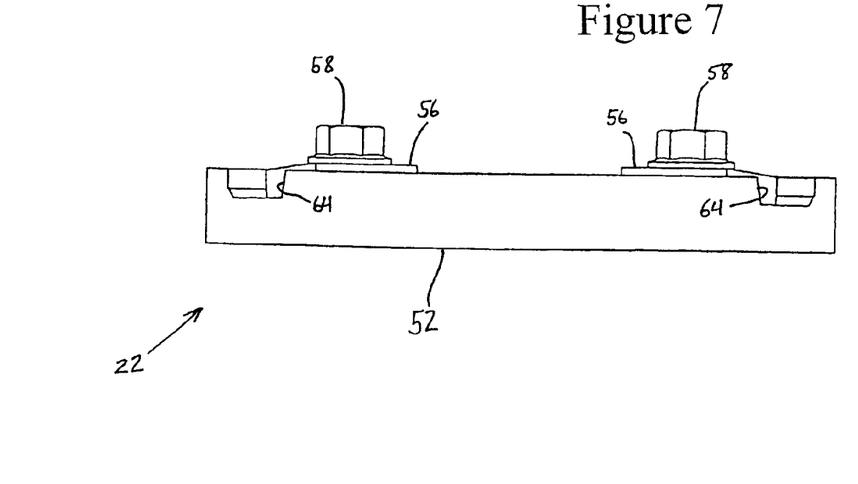
FIG. 7 is a side elevation of the axle retainer in FIG. 6.

Each clamping aperture 54 may be partly bounded by movable adjustment block 56, which is located at least partially in a channel 60 in base plate 52. Adjustment block 56 may have a recession 62 facing the center of clamping aperture 54, the recession 62 being shaped to receive an end portion of axle 40. Channel 60 may have an angled side surface 64 against which a portion of adjustment block 56 rests, the angled side surface 64 being angled to deflect adjustment block 56 toward the center of clamping aperture 54 by bolt 58, to grip axle 40 when bolt 58 is tightened. By tightening bolt 58 and thus urging adjustment block 56 toward the center of clamping aperture 54 until adjustment block 56 is tight against axle 40, axle 40 is held stationary during conveyor operation. Other embodiments of axle retainers may be found in commonly assigned U.S. patent application, Ser. No. 11/159,796 filed Jun. 23, 2005 by Cotter, et al., which is hereby incorporated herein by reference.

Axle retainer 22 may be connected to sidewall 14, 114 such as with at least one bolt 66 (FIG. 1) through a mounting aperture or hole 68 in base plate 52 (FIG. 6), and aligned such that clamping aperture 54 and sidewall aperture 48 are substantially coaxial. The base plate's 52 thickness, stiffness, and its connection to sidewall 14 impart a resistive bending moment to axle 40 and therefore to end roller 18, 118, 26 when conveying belt 20 is installed under tension. Further explanation and detail on the operation of alternative axle retainers may be obtained from U.S. patent application, Ser. No. 11/159,796.

Each zone 12, 112 of conveyor 10, 110 may include a photo eye or article sensor 70 (FIG. 1) for detecting and/or monitoring articles on conveying belt 20 of the respective zone. Article sensors 70 may be of the type disclosed in U.S. Pat. Nos. 5,582,286, 6,253,909, and/or 7,063,206, which are all hereby incorporated herein by reference. Belt conveyor 10 may further include a control (not shown) for independently operating lift devices 30 and contact assemblies 32 (FIG. 2) of the respective zone 12 to bring drive member 28 into frictional contact with rollers 16, 18 to move an article along zone 12 and/or to temporarily stop the movement of the article or articles to accumulate articles on zone 12 in response to sensor 70 and depending on the particular application of belt conveyor 10, as discussed in detail in U.S. Pat. No. 6,478,142. Similarly, and in the embodiment of FIG. 3, sensor 70 (as shown in FIG. 1) may be coupled with a control (not shown) for independently energizing motorized roller 34 of zone 110 in a similar manner to that enumerated above for the embodiment of FIGS. 1 and 2.

Accordingly, belt conveyor 10, 110 may transport articles or accumulate and transport articles in response to article sensor 70 that detects the presence of articles in a given zone 12, 112 or in response to one or more other control inputs. Conveying belt 20 is driven by one or more rollers (16, 18, 116, 118, 26, 34) around which conveying belt 20 is reeved. One or more of rollers 16, 18, 26 may be driven by drive member 28 that is selectively moved into contact with a lower portion of rollers 16, 18, 26 (FIGS. 1 and 2). When drive member 28 is lifted into contact with one or more of rollers 16, 18, 26, the resulting friction drives those rollers, which freely rotate about their axes to drive, guide, and support conveying belt 20 around the zone 12. Alternatively, rollers 116, 118 may be driven by a motor-driven roller, such as motorized roller 34 (FIG. 3) or an externally driven roller (not shown).

Retrofit kit 24 may be installed on an existing roller conveyor by first at least partly removing the rollers from the zone, optionally replacing two of rollers 16, 116 with replacement end rollers 26, stretching and reeving conveying belt 20 around the rollers (16, 18, 116, 118, 26, 34), and by optionally installing axle retainers 22 at each end of the axles 40 corresponding to each end roller 18, 118, 26.

The lift devices 30 (FIG. 2) or motor-driven roller 34 (FIG. 3) of a particular zone 12, 112 may be selectively activated or deactivated by a control (not shown), such as in response to a signal received from an article sensor 70, or in response to more than one of the article sensors positioned along the conveyor, to move or stop an article or articles that is/are present on the respective zone. Conveying belt 20 thus may be selectively driven and operable to selectively and independently convey or accumulate one or more articles on the associated zones in response to one or more of article sensors 70. The control and sensors may be operable to accumulate articles on the zones of the belt conveyor, and may be operable to individually control operation of at least some of the zones, such as by utilizing accumulating logic and/or circuitry and the like, such as that disclosed in U.S. Pat. No. 7,063,206 issued to Haan, et al. which is hereby incorporated herein by reference.

Though in the embodiment of FIGS. 1 and 2, drive member 28 may be urged into contact with any one roller or combination of rollers 16, 18, 26 in a given zone, it is preferable to urge drive member 28 into contact with at least one end roller 18, 26 of a given zone because end rollers 18, 26 generally exhibit high frictional contact with conveying belt 20, relative to the frictional contact between conveying belt and other rollers 16, due to belt tension acting predominantly on end rollers 18, 26. Substantially equivalently, in the embodiment of FIG. 3, motorized roller 34 may be in any position along zone 112, but it is preferable to place motorized roller 34 at one end of the zone 112 because of the above-noted frictional advantage at that location. Driving at least one roller located at an end of a zone may be especially useful when driving or accumulating articles along an incline or a decline, in which the higher friction between conveying belt and the rollers driving the belt is useful to counteract gravitational forces acting against uphill travel.

Therefore, the segmented or zoned belt conveyor of the present invention provides a plurality of independently operable zones which may operate together as a generally continuously running belt conveyor or may operate individually as an accumulating conveyor with zone control and photo eyes. The present invention thus provides a zone controlled belt conveyor which may operate in a similar manner as a zone controlled roller conveyor, but with a continuous conveying belt around the rollers rather than multiple O-rings or the like connecting the rollers to a motor-driven roller in each zone.

Retrofit kit 24 may be installed on a roller conveyor by removing the rollers (16, 116, 18, 118, 34) of a given zone 12, 112, reeving or routing conveying belt 20 around the previously removed rollers and stretching the conveying belt 20 while reinstalling the rollers (16, 116, 18, 118, 34). Axle retainers 22 may be connected to axles 40 and sidewalls 14, 114 at each end of each zone 12, 112 during installation of retrofit kit 24. Replacement end rollers 26 may be installed after removing the rollers to be replaced, and before stretching the conveying belt 20 around the rollers.

Changes and modifications in the specifically described embodiments may be carried out without departing from the principles of the present invention, which is intended to be limited only by the scope of the appended claims, as interpreted according to the principles of patent law.

The embodiments of the present invention in which an exclusive property or privilege is claimed are defined as follows:

1. A belt conveyor comprising:
spaced-apart opposite sidewalls and at least two rollers positioned along and between said opposite sidewalls defining at least one zone, two of said at least two rollers comprising end rollers located at opposite ends of said zone;
a continuous conveying belt reeved around said at least two rollers, said conveying belt defining a conveying surface between said opposite sidewalls of said belt conveyor, at least one of said at least two rollers being a driven roller that drives said conveying belt to move articles along said belt conveyor;
wherein said conveying belt is initially stretched in a lengthwise direction of said conveying belt at least 0.75 percent when said conveying belt is reeved around said at least two rollers; and
wherein said conveying belt is tracked around said rollers via engagement of said conveying belt with said rollers and without a take up device.

2. The belt conveyor of claim 1, wherein each of said end rollers is rotatable mounted to an axle, each of said axles having opposite ends that are received by and protrude from both of said sidewalls, and wherein said belt conveyor further comprises at least two axle retainers, each of said axle retainers having a base plate defining at least one aperture, said at least one aperture adapted to receive an end of said axle there through and to connect said end to said sidewall.

3. The belt conveyor of claim 2, said belt conveyor further comprising:
  a lift device, a contact assembly, and an endless drive member, said drive member having an upper portion traveling in a plane, said contact assembly selectively reciprocally movable by said lift device into engagement with said endless drive member to bring the upper portion of said endless drive member into engagement with said at least one driven roller and to drive said at least one driven roller to drive said conveying belt.

4. The belt conveyor of claim 3, wherein said conveying belt has a width greater than one half the length of said at least two rollers.

5. The belt conveyor of claim 4, wherein said conveying belt is substantially aligned at one end of said at least two rollers.

6. The belt conveyor of claim 5, wherein said drive member has a width less than half the length of said at least two rollers, and wherein said drive member is substantially aligned at an opposite end of said at least two rollers.

7. The belt conveyor of claim 3, wherein said drive member is a continuous belt.

8. The belt conveyor of claim 2, wherein at least one of said end rollers has at least one crown established thereon for tracking said conveying belt around said rollers.

9. The belt conveyor of claim 2 including at least one slider plate between said at least two rollers, said slider plate adapted to support said conveying belt between said at least two rollers.

10. The belt conveyor of claim 3, wherein said belt conveyor includes an article sensor which is operable to detect articles on said belt, said belt conveyor further including a control which is operable to selectively actuate said lift device, thus moving said contact assembly to bring the upper portion of said endless drive member into selective engagement with said at least one driven roller in response to said article sensor.

11. The belt conveyor of claim 3 comprising at least two tandem zones, each of said at least two tandem zones comprising at least two rollers and a continuous conveying belt.

12. The belt conveyor of claim 11, wherein each of said at least two tandem zones includes at least one article sensor operable to detect articles in that zone, said belt conveyor including at least one control operable to actuate said lift device to rotatably drive said at least one driven roller of at least one of said tandem zones to drive said conveying belt to convey articles along the respective zone, said at least one control being operable to selectively actuate said lift device to rotatably drive said at least one driven roller in response to said article sensors to provide accumulation of articles in said zones of said belt conveyor.

13. The belt conveyor of claim 2, wherein said driven roller is a motor-driven roller.

14. The belt conveyor of claim 13, wherein said motor-driven roller is a motorized roller.

15. The belt conveyor of claim 13, wherein said belt conveyor includes an article sensor which is operable to detect articles on said conveying belt, said belt conveyor further including a control which is operable to selectively activate said motor-driven roller in response to said article sensor.

16. The belt conveyor of claim 13 comprising at least two tandem zones, each of said at least two tandem zones comprising at least two rollers and a continuous conveying belt.

17. The belt conveyor of claim 16, wherein each of said tandem zones includes at least one article sensor operable to detect articles in that zone, said belt conveyor including at least one control operable to activate said motor-driven roller of at least one of said tandem zones to drive said conveying belt to convey articles along the respective zone, said at least one control being operable to selectively activate said motor-driven roller in response to said article sensors to provide accumulation of articles in said zones of said belt conveyor.

18. A retrofit kit for a roller conveyor, the conveyor having at least one zone, the conveyor comprising spaced-apart opposite sidewalls and at least two conveying rollers positioned along and between the opposite sidewalls, said kit comprising:
  at least one continuous conveying belt, wherein said conveying belt is adapted to be initially stretched at least 0.75 percent in a lengthwise direction when said conveying belt is reeved around the conveying rollers;
  at least one replacement end roller, wherein said at least one replacement end roller is rotatably mounted to an axle, and wherein said axle has opposite ends that are adapted to extend through and protrude from both of the sidewalls; and
  at least two axle retainers, each of said axle retainers defining at least one aperture, said at least one aperture adapted to receive an end of said axle there through and adapted to connect said end to the sidewall.

19. The retrofit kit of claim 18, wherein at least one of said replacement end rollers has at least one crown established thereon for tracking said conveying belt around the conveying rollers.

20. The retrofit kit of claim 18 including at least one slider plate between the at least two rollers adapted to support said conveying belt between the rollers.

21. A method of converting a roller conveyor to a belt conveyor, the roller conveyor having spaced-apart opposite sidewalls and at least two conveying rollers, each of the at least two conveying rollers rotatably mounted to an axle and positioned along and between the opposite sidewalls defining at least one zone, two of the at least two conveying rollers comprising end rollers located at opposite ends of the zone, the sidewall having a plurality of apertures adapted to receive opposite ends of said axles, wherein said method comprises:
  (a) providing at least one continuous conveying belt adapted to be initially stretched at least 0.75 percent in a lengthwise direction when said conveying belt is reeved around the conveying rollers, at least one replacement end roller rotatably mounted to an axle and adapted to be positioned along and between the opposite sidewalls, and at least two axle retainers, each of said axle retainers defining at least one aperture adapted to receive an end of the axle of said at least one replacement end roller;
  (b) removing the at least two conveying rollers from at least one of the sidewalls;
  (c) replacing at least one of the two end rollers at opposite ends of the at least one zone with said at least one replacement end roller;
  (d) reeving said conveying belt around the rollers;
  (e) stretching said conveying belt at least 0.75 percent;
  (f) positioning the rollers along and between the opposite sidewalls;
  (g) receiving an end of said axle through said at least one aperture in said axle retainer and connecting said axle retainers to said axle; and
  (h) connecting said axle retainers to the sidewalls, said apertures in said axle retainers being substantially aligned with said apertures in said sidewalls.

* * * * *

UNITED STATES PATENT AND TRADEMARK OFFICE
CERTIFICATE OF CORRECTION

PATENT NO.         : 7,467,708 B2
APPLICATION NO.    : 11/651810
DATED              : December 23, 2008
INVENTOR(S)        : Michael Thane McGettingan et al.

It is certified that error appears in the above-identified patent and that said Letters Patent is hereby corrected as shown below:

Column 6
Line 13, "FIG." should be --FIGS.--.

Column 8
Line 65, Claim 2, "rotatable" should be --rotatably--.

Signed and Sealed this

Twenty-fourth Day of March, 2009

JOHN DOLL
*Acting Director of the United States Patent and Trademark Office*